United States Patent
Petersen

(10) Patent No.: US 12,552,359 B2
(45) Date of Patent: Feb. 17, 2026

(54) TEST ARRANGEMENT FOR FUNCTIONAL TESTING OF A VEHICLE BRAKE CONTROL SYSTEM

(71) Applicant: AUDI AG, Ingolstadt (DE)

(72) Inventor: Krister Petersen, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 895 days.

(21) Appl. No.: 17/859,083

(22) Filed: Jul. 7, 2022

(65) Prior Publication Data

US 2023/0023343 A1    Jan. 26, 2023

(30) Foreign Application Priority Data

Jul. 15, 2021   (DE) .......................... 102021118337.5

(51) Int. Cl.
*B60T 13/74*    (2006.01)
*B60T 17/22*    (2006.01)

(52) U.S. Cl.
CPC .......... *B60T 17/221* (2013.01); *B60T 13/746* (2013.01); *B60T 2270/406* (2013.01); *B60T 2270/413* (2013.01)

(58) Field of Classification Search
CPC ......... B60T 8/17; B60T 17/221; B60T 13/746
See application file for complete search history.

(56) References Cited

U.S. PATENT DOCUMENTS

| | | | |
|---|---|---|---|
| 6,175,798 B1 * | 1/2001 | Carpenter | B60T 8/885 701/76 |
| 10,131,329 B1 | 11/2018 | Georgin et al. | |
| 2015/0291279 A1 | 10/2015 | Iordanidis et al. | |

FOREIGN PATENT DOCUMENTS

| | | |
|---|---|---|
| CN | 101479136 A | 7/2009 |
| CN | 108068785 A | 5/2018 |
| CN | 109080596 A | 12/2018 |
| CN | 109677388 A | 4/2019 |
| CN | 111886165 A | 11/2020 |
| DE | 19751431 A1 | 7/1999 |
| DE | 102007031819 A1 | 1/2009 |
| DE | 102008003379 A1 | 7/2009 |
| DE | 102011110892 A1 | 2/2013 |

(Continued)

OTHER PUBLICATIONS

Office Action issued on Mar. 28, 2025, in corresponding Chinese Application No. 202210773849.7, 12 pages.

(Continued)

*Primary Examiner* — Nicholas J Lane
(74) *Attorney, Agent, or Firm* — Maier & Maier, PLLC

(57) ABSTRACT

A test arrangement for functional testing of a brake control system in a vehicle, in which either a first parking brake system or a second parking brake system can be installed, wherein the brake control system has a control device with a first control module for controlling the first parking brake system, and has a second control module for controlling the second parking brake system, and wherein either the first control module or the second control module can be activated by means of a coding unit, in order to control the associated parking brake system, while the non-activated control module remains inoperative. The brake control system has a test unit with which a swap plausibility check can be carried out, which can be used to check whether the correct control module for the installed parking brake system is activated.

17 Claims, 6 Drawing Sheets

(56) References Cited

FOREIGN PATENT DOCUMENTS

| | | |
|---|---|---|
| DE | 102017204157 A1 | 9/2018 |
| DE | 102019215536 A1 | 4/2021 |
| EP | 2955405 B1 | 2/2017 |
| EP | 2955408 B1 | 11/2019 |
| EP | 3741635 A1 | 11/2020 |

OTHER PUBLICATIONS

European Search Report issued on Nov. 29, 2022, in corresponding European Application No. 22178189.1, 11 pages.
German Search Report issued on Sep. 6, 2022, in connection with corresponding German Application No. 10 2021 118 337.5 (8 pp., including machine-generated English translation).

\* cited by examiner

TEST ARRANGEMENT FOR FUNCTIONAL TESTING OF A VEHICLE BRAKE CONTROL SYSTEM

FIELD

The disclosure relates to a test arrangement for functional testing of a brake control system in a vehicle and a method for carrying out such a functional testing.

BACKGROUND

In a vehicle, the service brakes of the two rear wheels can each additionally have a parking brake system. The following two types of parking brake systems are used in premium vehicles: Firstly, the parking brake system can have a combination brake caliper with an integrated parking brake actuator, which can be controlled by a control device of the brake control system. As an alternative to this, the parking brake system can secondly have a parking brake drum with an integrated parking brake actuator, which can also be controlled by the control device of the brake control system. The available travel of the parking brake actuator integrated in the parking brake drum is more limited than the parking brake actuator integrated in the combination brake caliper. For this reason, the parking brake actuator integrated in the parking brake drum is also installed with a position sensor, such as a Hall sensor. The position sensor determines a current position of the parking brake actuator and has a signal connection with the control device of the brake control system.

A functional testing of a brake control system in a vehicle is carried out with the aid of a generic test arrangement. Either a first parking brake system (i.e., combination brake caliper) or a second parking brake system (i.e., parking brake drum) can be installed in the vehicle. The brake control system has a control device with a first control module for controlling the first parking brake system and a second control module for controlling the second parking brake system. In addition, the brake control system has control logic for the hydraulically operated service brakes of the vehicle.

The control logic, the first control module and the second control module are software components of a brake control system control device. Depending on the type of parking brake system installed, coding is carried out in the vehicle manufacturing plant or in a workshop, in which either the first control module or the second control module in the control device is activated by means of a coding unit in order to control the installed parking brake system correctly, while the non-activated control module remains inoperative.

In the case of incorrect coding, the following situation arises: The incorrect coding, i.e., an unintentional swap of the control modules, can possibly lead to component damage in the installed parking brake system. This is because the first control module and the second control module control the associated parking brake systems with different current/voltage levels. A brake component swap system is known from EP 2 955 405 B1.

SUMMARY

An object of the disclosure is to provide a test arrangement for functional testing of a vehicle brake control system, in which component damage in the parking brake system due to incorrect coding can be avoided in a simple manner.

The disclosure is based on a test arrangement for functional testing of a brake control system in a vehicle. Either a first parking brake system (i.e., combination brake caliper) or a second parking brake system (i.e., parking drum brake) can be installed in the vehicle. The brake control system has a control device with a first control module and a second control module. Component damage is avoided when the first parking brake system is controlled with the first control module, or alternatively the second parking brake system is controlled with the second control module.

Depending on the type of parking brake system installed in the vehicle, coding is carried out in the vehicle manufacturing plant or in a workshop, in which a coding unit activates either the first control module or the second control module in order to correctly control the installed parking brake system. The non-activated control module, on the other hand, has no control access to the built-in parking brake system, i.e., it remains inoperative. The brake control system has a test unit, with which a swap plausibility check is carried out in order to recognize incorrect coding of the control modules. If such an incorrect coding is present, the test unit can generate a warning signal and/or switch off the built-in parking brake system, so that component damage to the parking brake system is avoided. Based on the swap plausibility check according to the disclosure, it is checked whether the correct control module for the installed parking brake system is activated or not.

The test unit evaluates an assignment of the first control module to the first parking brake system as plausible. In the same way, the test unit evaluates an assignment of the second control module to the second parking brake system as plausible. In contrast to this, the test unit evaluates an assignment of the second control module to the first parking brake system as implausible, that is to say as incorrect coding. Similarly, the test unit evaluates an assignment of the first control module to the second parking brake system as implausible, i.e., as incorrect coding.

In a technical implementation, the test unit can have a determination block for determining the control module which is activated (by means of the coding). In addition, the test unit can have a determination block for determining the parking brake system installed in the vehicle. On the basis of the two determination blocks, the test unit can carry out the swap plausibility check according to the disclosure.

After the incorrect coding has been established and documented, control of the parking brake is preferably prevented. In this case, any control of the parking brake is prevented in order to provide effective component protection.

During the coding, the coding unit generates a coding signal with which the brake control system can be controlled. Based on the coding signal, one of the two control modules is activated in the control device of the brake control system.

In a specific embodiment variant, the first parking brake system can have a combination brake caliper with an integrated parking brake actuator, which can be controlled by the brake control system control device. The second parking brake system that can be installed as an alternative can have a parking brake drum in which a parking brake actuator and a position sensor are integrated. A current position of the parking brake actuator can be determined with the aid of the position sensor. The position sensor is in signal communication with the second control module to communicate the current actuator position to the second control module.

The second control module can have a sensor diagnostic block. If the second parking brake system is installed in the vehicle, its position sensor can be brought into a signal connection with the sensor diagnostic block. With the help of the sensor diagnostic block, a perfect installation of the position sensor can be identified. In this case, the sensor diagnostic block generates a corresponding installation signal. In the same way, the sensor diagnostic block can also recognize that the position sensor is not installed and generate a corresponding non-installation signal.

In a design that is simple in terms of signaling technology, the test unit can carry out the swap plausibility check according to the disclosure on the basis of the installation signal, the non-installation signal and the coding signal.

In this case, the test unit can recognize incorrect coding when detecting the coding signal for activating the first parking brake system (works without position sensor) and when detecting the installation signal (i.e., position sensor is connected to the control device). In the same way, the test unit can recognize incorrect coding when detecting the coding signal for activating the second parking brake system (works with a position sensor) and when detecting the non-installation signal (i.e., there is no position sensor connected to the control device).

BRIEF DESCRIPTION OF THE DRAWINGS

An exemplary embodiment of the disclosure is described below with reference to the accompanying figures. In particular:

In FIG. 1, a braking system of a four-wheel vehicle is described insofar as it is necessary for understanding the disclosure. Accordingly, the braking system has a service brake B on each of the front wheels FR and rear wheels RW, which brake is integrated in a hydraulic circuit, in which a hydraulic chamber 1 of a pressure generator 3 implemented as a piston-cylinder unit is connected via a hydraulic line 5 to a hydraulic chamber 7 of a brake cylinder 9 (FIG. 5). The brake cylinder 9 is integrated in a cast brake caliper 10. Stroke-adjustable brake pads 11 are arranged in the cast brake caliper 10 and interact with a brake disc 13 on the vehicle wheel. The pressure generator 3 can be controlled via a control logic 15 of a brake control system control device 16. During driving operation, the control logic 15 generates an actuating signal $y_1$, with which the pressure generator 3 can be controlled, on the basis of a deceleration setting generated by the driver via a brake pedal 17. In the pressure generator 3, depending on the actuating signal $y_1$, the hydraulic pressure applied to the brake cylinder piston 19 (FIG. 5) of the brake cylinder 9 can be increased in order to bring the brake pads 11 into braking engagement with the brake disc 13.

Figure 1:
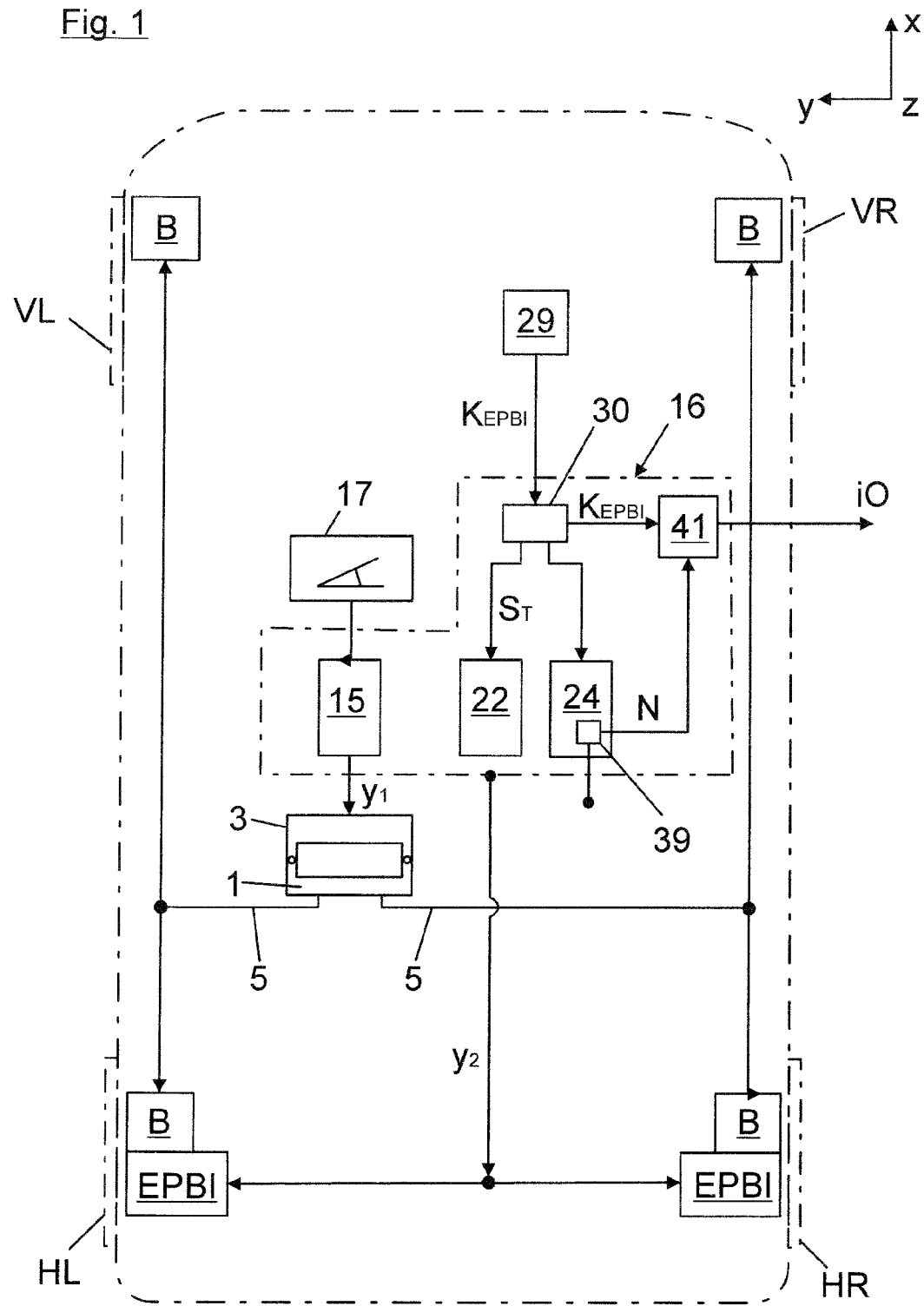
FIG. 1 shows a roughly schematic view of a vehicle with an EPBI parking brake system installed therein, and with a DSE parking brake system installed therein (FIG. 2)
Figure 5:
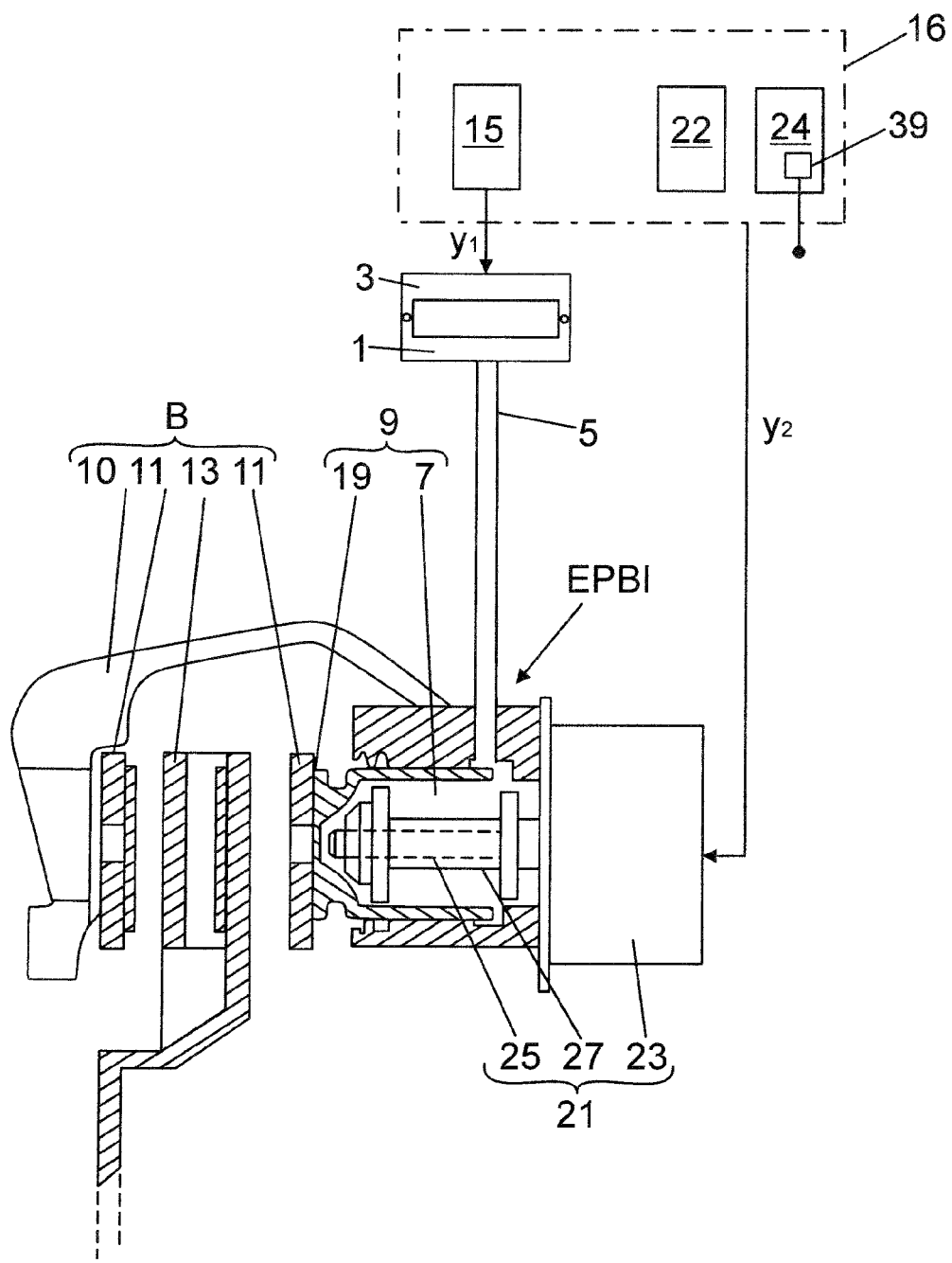
FIG. 5 shows schematic diagrams of an EPBI parking brake system and of a DSE parking brake system.

As can be seen from FIG. 1, EPBI parking brake systems (EPBI=integrated electric parking brake) are installed on the rear wheels HR of the vehicle. Here, the cast brake caliper 10 acts as a combination brake caliper with an integrated parking brake actuator 21 (FIG. 5). This can be controlled by a first control module 22 of the control unit 16. The parking brake actuator 21 is composed in FIG. 5 of a rotary drive motor 23 with a threaded spindle 25 which, together with a pressure nut 27, forms a threaded drive. This protrudes into the hydraulic chamber 7 of the brake cylinder 9 in FIG. 5. When the parking brake actuator 21 is actuated, the pressure nut 27 moves to the left in FIG. 5, whereby the brake cylinder piston 19 is pushed, together with the brake pads 11, in braking engagement against the brake disc 13, in particular while generating a tensioning force, through which the parking brake actuator 21 pushes, with the interposition od the brake cylinder piston 19, the brake pads 11 against the brake disc 13.

As can also be seen from FIG. 1, in addition to the control logic 15 and the first control module 22, the control device 16 has a second control module 24, which is used to control a DSE parking brake system, which will be described later. Coding takes place in the vehicle manufacturing plant or in a workshop before the vehicle is put into operation. During the coding, the coding signal $K_{EPBI}$ generated by the coding unit 29 is present at the signal input of an input block 30 of the control device 16. On the basis of the coding signal $K_{EPBI}$, the input block 30 generates an activation signal $S_T$, with which the first control module 22 in FIG. 1 is activated in order to carry out a proper control of the EPBI parking system. The second control module 24 of the control device 16 remains deactivated.

Figure 2:
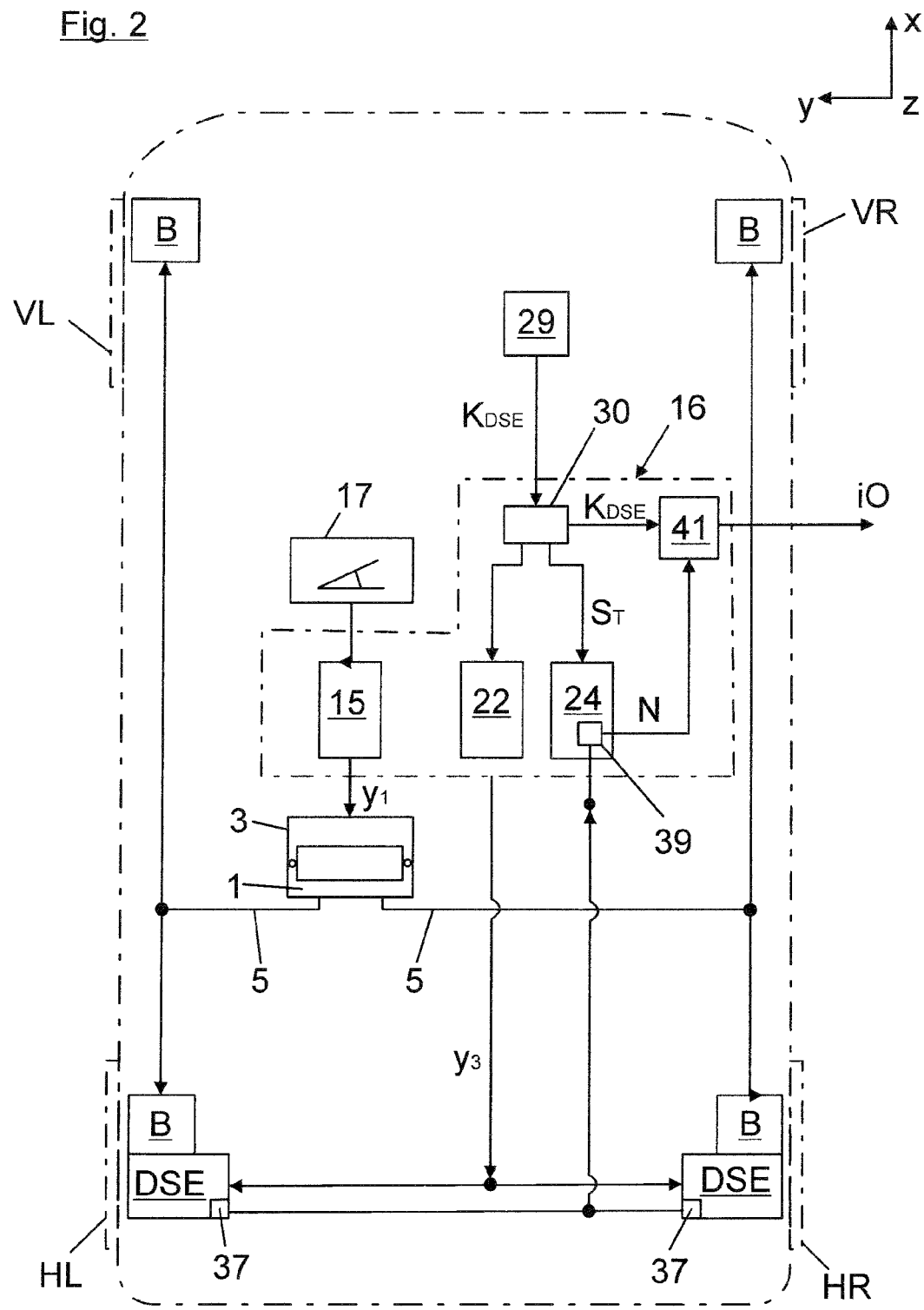
FIG. 2 shows a roughly schematic view of a vehicle with an EPBI parking brake system installed therein (FIG. 1), and with a DSE parking brake system installed therein.
Figure 3:
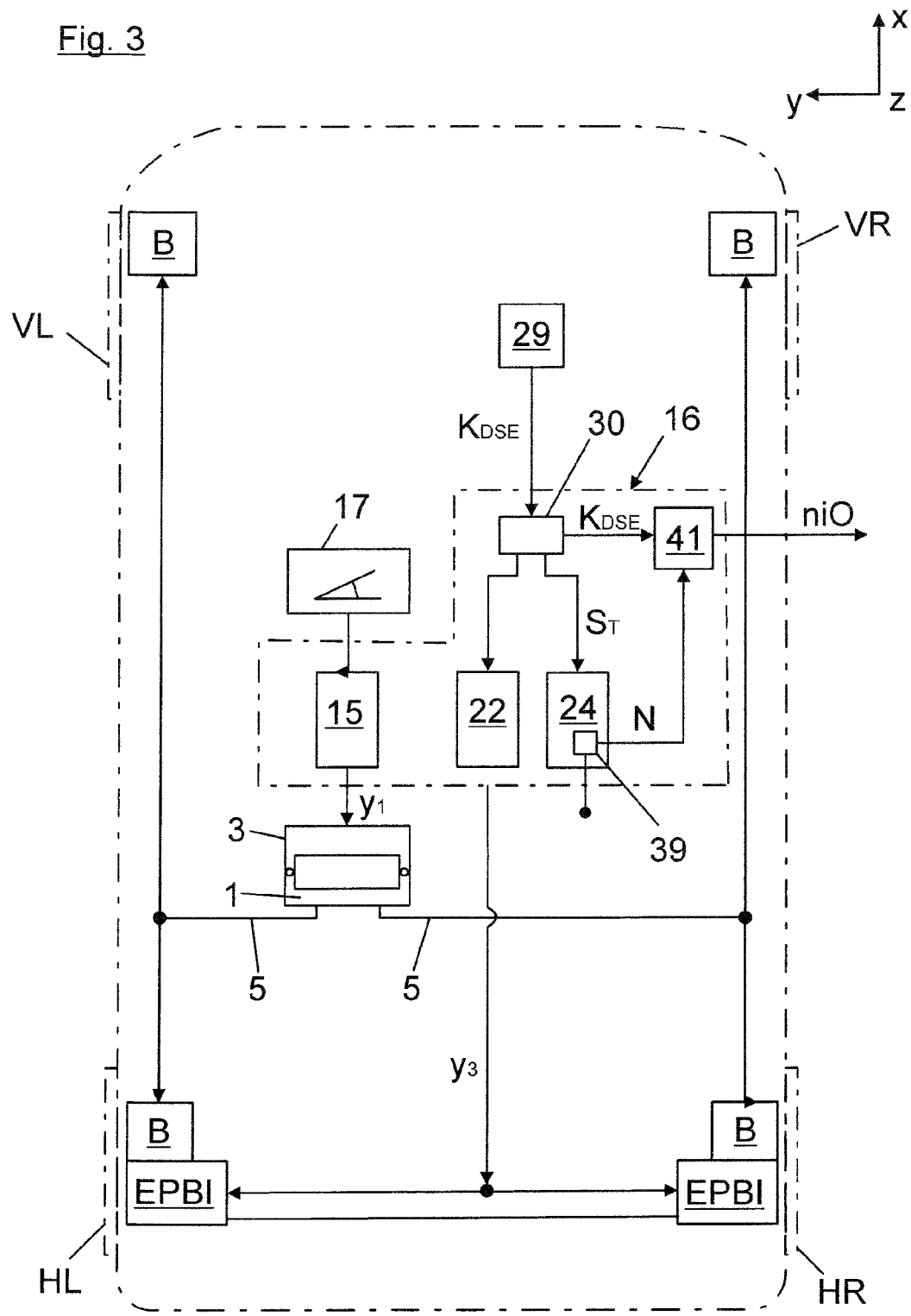
FIG. 3 shows a view corresponding to FIGS. 1 and 2, in each of which incorrect coding is illustrated.
Figure 4:
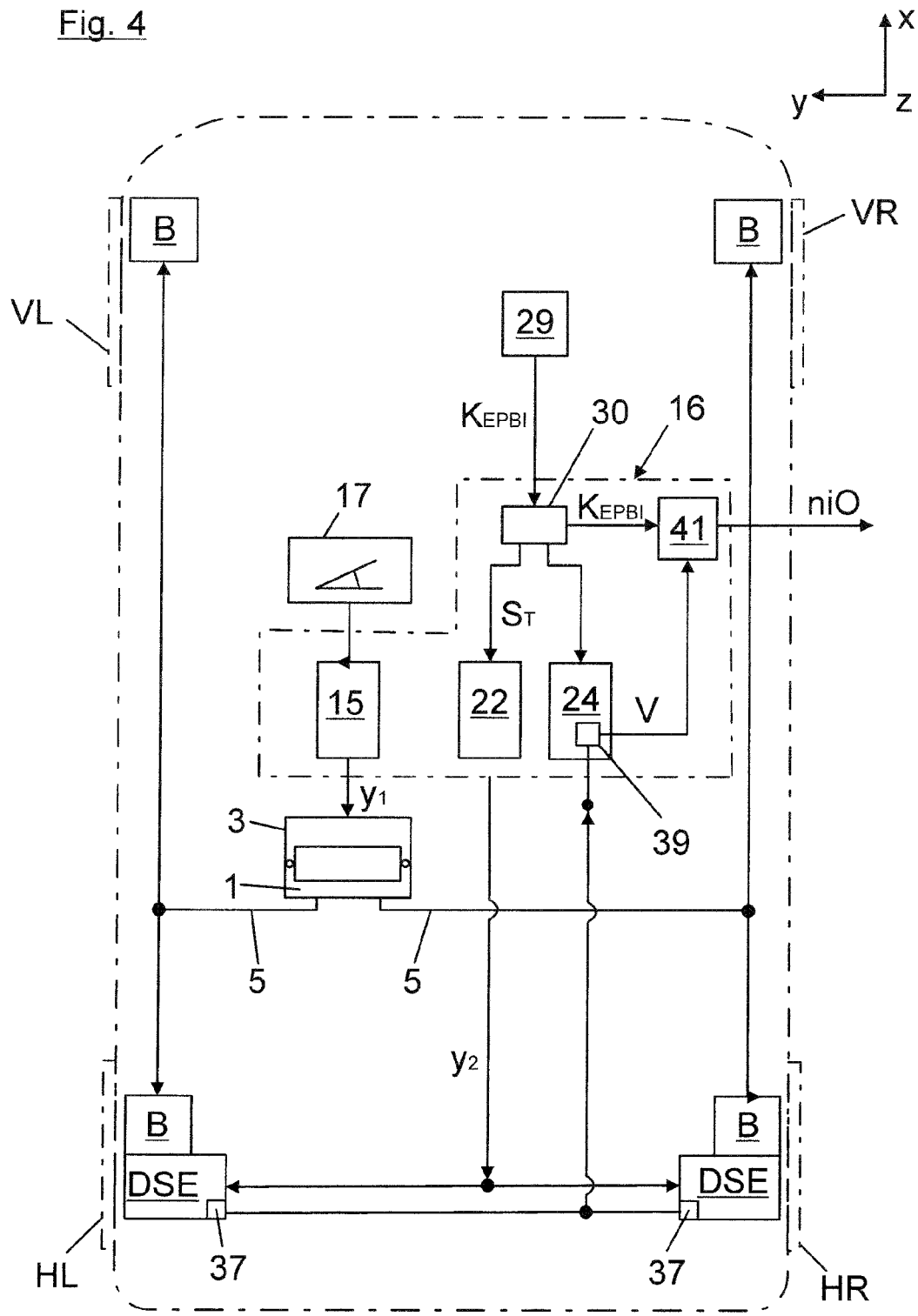
FIG. 4 show shows a view corresponding to FIGS. 1 and 2, in each of which incorrect coding is illustrated.
Figure 6:
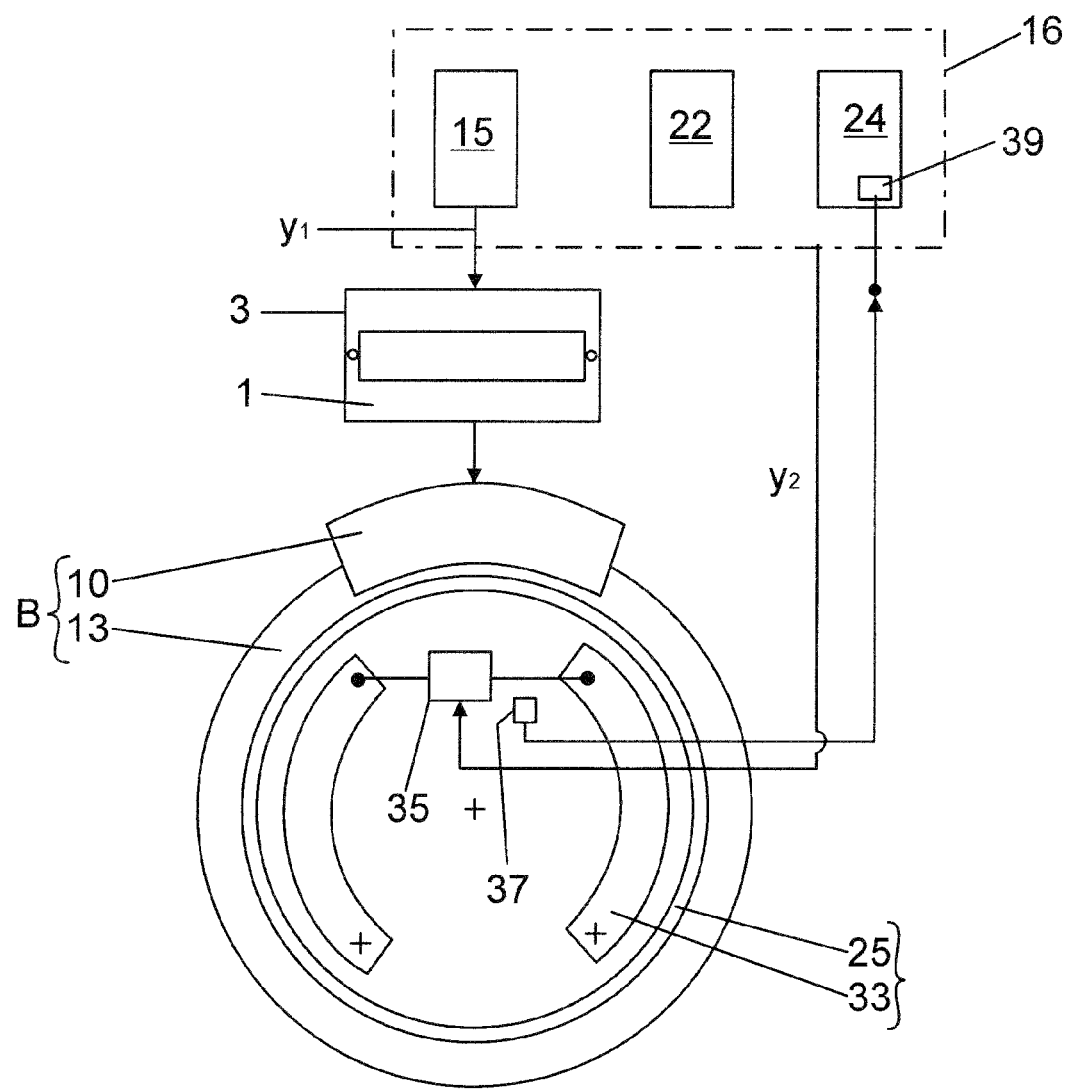
FIG. 6 shows schematic diagrams of an EPBI parking brake system and of a DSE parking brake system.

As an alternative, a DSE parking brake system (DSE=Dual-Servo-Electric) is installed on each of the rear wheels HR of the vehicle in FIG. 2. In FIG. 6, the DSE parking brake system has a parking brake drum 31 which is arranged radially inside the cast brake caliper 10 and which interacts with brake shoes 33. The brake shoes 33 can be brought into braking engagement with the inner circumference of the parking brake drum 31 via a parking brake actuator 35. The parking brake actuator 35 can be controlled by the second control module 24 of the control device 16 via actuating signals $y_3$. In addition, a position sensor 37 (for example a Hall sensor) is assigned to the parking brake actuator 35 in order to determine a current position of the parking brake actuator 35. The position sensor 37 is in signal connection with the second control module 24.

As can also be seen from the figures, the second control module 24 has a sensor diagnostic block 39. The sensor diagnostic block 39 recognizes that the position sensor 37 is correctly installed and generates a corresponding installation signal V. Alternatively, the sensor diagnostic block 39 also recognizes that the position sensor 37 is not installed. In this case, the sensor diagnostic block 39 generates a corresponding non-installation signal N.

During the coding, according to FIG. 2, the coding signal $K_{DSE}$ generated by the coding unit 29 is present at the signal input of an input block 30 of the control device 16. Based on the coding signal $K_{DSE}$, the input block 30 generates an activation signal $S_T$, with which the second control module 24 is activated in FIG. 2, while the first control module 22 remains deactivated.

In order to document an incorrect coding of the control modules 22, 24, the control device 16 has a test unit 41 according to the disclosure. The test unit 41 can be used to perform a swap plausibility check, by which it is checked whether the correct control module for the installed parking brake system is activated. The test unit 41 carries out the swap plausibility check on the basis of the installation signal V, the non-installation signal N and the coding signals $K_{EPBI}$, $K_{DSE}$. When the coding signal $K_{EPBI}$ for activating the EPBI parking brake system is detected (works without position sensor 37) and when the installation signal V is detected (that is, position sensor 37 is installed), the test unit 41 recognizes the incorrect coding. In the same way, the test unit 41 recognizes an incorrect coding if the coding signal $K_{DSE}$ for activating the DSE parking brake system (works with position sensor 37) and the non-installation signal N (i.e., no position sensor 37 installed) is detected.

The invention claimed is:

1. A test arrangement for functional testing of a brake control system in a vehicle in which a first parking brake system or a second parking brake system is installable, wherein:
   the brake control system has a control device with a first control module for controlling the first parking brake system and a second control module for controlling the second parking brake system;
   wherein either the first control module or the second control module can be activated by a coding unit in order to control the associated parking brake system, while the non-activated control module remains inoperative; and
   wherein the brake control system has a test unit with which a swap plausibility check can be carried out, on the basis of which it can be checked whether the correct control module is activated for the installed parking brake system.

2. The test arrangement of claim 1, wherein;
   as part of the swap plausibility check, the test unit is configured to evaluate an assignment of the first control module to the first parking brake system or an assignment of the second control module to the second parking brake system to be plausible;
   as part of the swap plausibility check, the test unit is configured to evaluate an assignment of the second control module to the first parking brake system or an assignment of the first control module to the second parking brake system to be implausible, i.e., as incorrect coding;
   after the incorrect coding has been identified and documented, a control of the parking brake is also effectively prevented; and
   after the incorrect coding has been identified and documented, any control of the parking brake is prevented in order to provide effective component protection.

3. The test arrangement of claim 1, wherein:
   the test unit has a first determination block for determining the activated control module and a second determination block for determining the parking brake system installed in the vehicle; and
   the test unit performs the swap plausibility check on the basis of the first and second determination blocks.

4. The test arrangement of claim 1, wherein:
   during coding, the coding unit generates a coding signal with which the control device of the brake control system can be controlled; and
   one of the control modules of the control device can be activated on the basis of the coding signal.

5. The test arrangement of claim 1, wherein:
   the first parking brake system has a combination brake caliper with an integrated parking brake actuator, which can be controlled by the control device;
   the second parking brake system has a parking brake drum with an integrated parking brake actuator, as well as a position sensor in order to determine a current position of the parking brake actuator; and
   in the installed state, the position sensor is in signal communication with the second control module.

6. The test arrangement of claim 5, wherein:
   the second control module has a sensor diagnostic block;
   when the second parking brake system is installed in the vehicle, the position sensor is in signal connection with the sensor diagnostic block; and
   the sensor diagnostic block recognizes that the position sensor has been installed correctly and generates a corresponding installation signal, or the sensor diagnostic block recognizes that the position sensor is not installed and generates a corresponding non-installation signal.

7. The test arrangement of claim 6, wherein the swap plausibility check is performed on the basis of the installation signal, the non-installation signal, and the coding signals.

8. The test arrangement of claim 7, wherein, as part of the swap plausibility check, upon detection of the coding signal for activating the first parking brake system, and upon detection of the installation signal, which indicates that the position sensor is installed, the test unit recognizes an incorrect coding.

9. The test arrangement of claim 7, wherein, as part of the swap plausibility check, upon detection of the coding signal for activating the second parking brake system, and upon detection of the non-installation signal, which indicates that the position sensor is not installed, the test unit recognizes an incorrect coding.

10. A method for functional testing of a brake control system in a vehicle in which either a first parking brake system or a second parking brake system is installable, wherein the brake control system has a control device with a first control module for controlling the first parking brake system and has a second control module for controlling the second parking brake system, the method comprising:
    activating either the first control module or the second control module by a coding unit, in order to control the associated parking brake system, while maintaining the non-activated control module inoperative; and
    carrying out a swap plausibility check in the brake control system in order to check whether a correct control module for the installed parking brake system is activated.

11. The test arrangement of claim 2, wherein;
    the test unit has a first determination block for determining the activated control module and a second determination block for determining the parking brake system installed in the vehicle; and
    the test unit performs the swap plausibility check on the basis of the first and second determination blocks.

12. The test arrangement of claim 2, wherein;
    during coding, the coding unit generates a coding signal with which the control device of the brake control system can be controlled; and
    one of the control modules of the control device can be activated on the basis of the coding signal.

13. The test arrangement of claim 3, wherein:
    during coding, the coding unit generates a coding signal with which the control device of the brake control system can be controlled; and
    one of the control modules of the control device can be activated on the basis of the coding signal.

14. The test arrangement of claim 2, wherein:
    the first parking brake system has a combination brake caliper with an integrated parking brake actuator, which can be controlled by the control device;

the second parking brake system has a parking brake drum with an integrated parking brake actuator, as well as a position sensor in order to determine a current position of the parking brake actuator; and in the installed state, the position sensor is in signal communication with the second control module.

15. The test arrangement of claim 3, wherein:

the first parking brake system has a combination brake caliper with an integrated parking brake actuator, which can be controlled by the control device;

the second parking brake system has a parking brake drum with an integrated parking brake actuator, as well as a position sensor in order to determine a current position of the parking brake actuator; and in the installed state, the position sensor is in signal communication with the second control module.

16. The test arrangement of claim 4, wherein:

the first parking brake system has a combination brake caliper with an integrated parking brake actuator, which can be controlled by the control device;

the second parking brake system has a parking brake drum with an integrated parking brake actuator, as well as a position sensor in order to determine a current position of the parking brake actuator; and in the installed state, the position sensor is in signal communication with the second control module.

17. The test arrangement of claim 8, wherein, as part of the swap plausibility check, upon detection of the coding signal for activating the second parking brake system, and upon detection of the non-installation signal, which indicates that the position sensor is not installed, the test unit recognizes an incorrect coding.

* * * * *